(12) United States Patent
Yamaguchi (10) Patent No.: US 7,933,630 B2
(45) Date of Patent: *Apr. 26, 2011

(54) RADIO COMMUNICATION TERMINAL
(75) Inventor: Kentoku Yamaguchi, Hachioji (JP)
(73) Assignee: Fujitsu Toshiba Mobile Communications Limited, Kawasaki (JP)
( * ) Notice: Subject to any disclaimer, the term of this patent is extended or adjusted under 35 U.S.C. 154(b) by 627 days.

This patent is subject to a terminal disclaimer.

(21) Appl. No.: 11/797,285
(22) Filed: May 2, 2007
(65) Prior Publication Data
US 2007/0206518 A1  Sep. 6, 2007

Related U.S. Application Data (62) Division of application No. 09/856,727, filed as application No. PCT/JP00/06499 on Sep. 22, 2000, now Pat. No. 7,224,999.

(30) Foreign Application Priority Data

Sep. 29, 1999 (JP) .................................. 11-275516

(51) Int. Cl.
H04B 1/38 (2006.01)
H04M 1/00 (2006.01)
(52) U.S. Cl. .... 455/566; 455/557; 455/3.06; 348/14.01; 348/14.02; 348/14.07; 370/329; 370/341; 370/352; 370/353
(58) Field of Classification Search ............... 455/414.1, 455/451, 452.2, 3.06, 557, 566, 412.1; 348/14.01, 348/14.02, 14.07
See application file for complete search history.

(56) References Cited

U.S. PATENT DOCUMENTS

| | | | |
|---|---|---|---|
| 4,943,994 A | 7/1990 | Ohtsuka et al. | |
| 5,159,445 A | 10/1992 | Gitlin et al. | |
| 5,594,782 A | 1/1997 | Zicker et al. | |
| 5,760,824 A | 6/1998 | Hicks | |
| 5,781,542 A | 7/1998 | Tanaka et al. | |
| 6,085,112 A | 7/2000 | Kleinschmidt et al. | |
| 6,112,084 A | 8/2000 | Sicher et al. | |
| 6,230,013 B1 | 5/2001 | Wallentin et al. | |
| 6,259,449 B1 | 7/2001 | Saxena et al. | |
| 6,275,258 B1 | 8/2001 | Chim | |
| 6,374,112 B1 | 4/2002 | Widegren et al. | |
| 6,608,832 B2 | 8/2003 | Forslow | |
| 6,608,838 B2 | 8/2003 | Ozluturk | |
| 6,697,346 B1 | 2/2004 | Halton et al. | |

(Continued)

FOREIGN PATENT DOCUMENTS

| | | |
|---|---|---|
| GB | 2311910 | 10/1997 |
| JP | 03-079191 | 4/1991 |
| JP | 05-327580 | 12/1993 |
| JP | 09-139927 | 5/1997 |
| JP | 09-294166 | 11/1997 |
| JP | 11146370 | 5/1999 |
| JP | 2004/120344 | 4/2004 |

OTHER PUBLICATIONS

Notice of Reasons for Rejection, mailed from the Japanese Patent Office on Jun. 5, 2007, in Japanese Patent Appl. No. 1999-275516 (4 pages). Decision of Rejection, mailed from the Japanese Patent Office on Oct. 2, 2007, in Japanese Patent Appl. No. 1999-275516 (4 pages).

*Primary Examiner* — Sujatha Sharma
(74) *Attorney, Agent, or Firm* — Maschoff Gilmore & Isrealsen (57) ABSTRACT

A radio section 1 and a control section 2 allow communications using two radio channels simultaneously, such as TV phone communication and message communication. An LCD 33 displays information concerning each communication simultaneously or selectively when simultaneous communications are being made using two radio channels. Even if communications are made using two radio channels simultaneously, excellent operability is provided and a radio communication terminal can be realized which is low in cost and power dissipation.

9 Claims, 6 Drawing Sheets

U.S. PATENT DOCUMENTS

| | | |
|---|---|---|
| 6,704,813 B2 | 3/2004 | Smirnov et al. |
| 6,738,357 B1 | 5/2004 | Richter et al. |
| 2001/0008412 A1 | 7/2001 | Ando et al. |
| 2002/0102947 A1 | 8/2002 | Hofman |
| 2004/0189791 A1 | 9/2004 | Haruki |
| 2005/0140778 A1 | 6/2005 | Kim et al. |
| 2006/0050141 A1 | 3/2006 | Yoshimura |
| 2006/0055771 A1 | 3/2006 | Kies |

RADIO COMMUNICATION TERMINAL

CROSS-REFERENCES OF RELATED APPLICATIONS

This is a divisional application of U.S. application Ser. No. 09/856,727, filed May 25, 2001, now U.S. Pat. No. 7,224,999 which is a national stage application based on PCT Patent Application No. PCT/JP00/06499, filed on Sep. 22, 2000 in Japan, which claims priority of Japanese Patent Application No. 11-275516 filed Sep. 29, 1999, the entire contents of all of which are incorporated herein by reference.

TECHNICAL FIELD

The present invention relates to a radio communication terminal which is allowed to make communications simultaneously over multiple radio channels.

BACKGROUND ART

Figure 8:
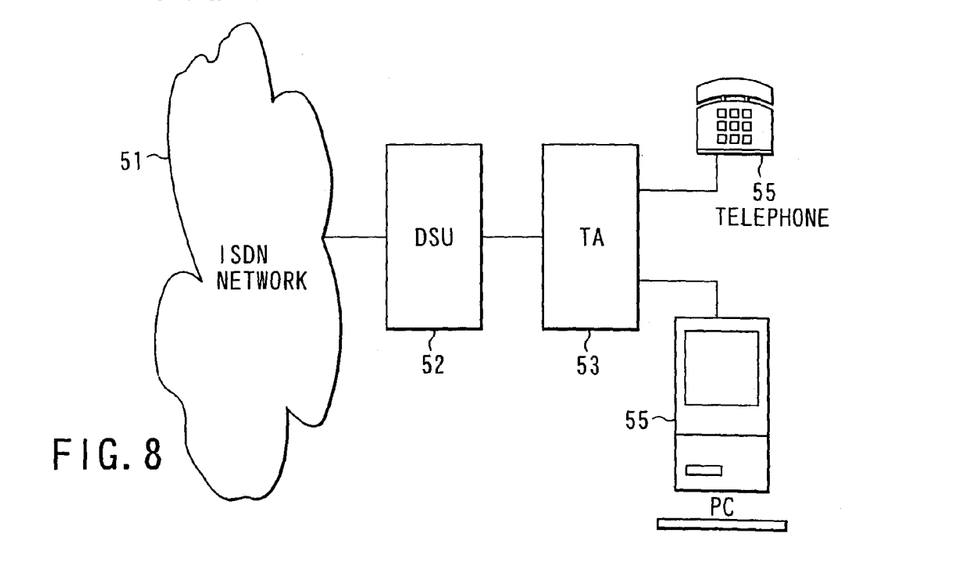
FIG. 8 shows an example a conventional communication system using an ISDN network.

Conventionally, as a system that connects a plurality of channels there exists a communication system that uses an ISDN network 51 as shown in FIG. 8. According to this communication system, using a plurality of wired channels, a telephone set 54 and a personal computer (PC) 55, each of which is an independent communication terminal, are connected with the ISDN network 51 through digital channel terminating equipment (DSU: Digital Service Unit) 52 and a TA (Terminal Adapter) 3. Each terminal makes communications with a communication terminal (not shown) which is connected with the ISDN network 51 with which the connection has been set up.

In such a system, when communications are made over multiple channels, as many terminals as the channels are needed. That is, when an operator simultaneously makes communications over multiple channels, it is required, for example, for the operator to keep multiple terminals at hand and to watch user information and status indications provided visibly and audibly to user interfaces, such as displays of the respective terminals, so as not to overlook them. For this reason, when the operator is paying much attention to communications such as TV telephone communications, even if a message communication has come in another terminal, the operator overlooks the information or cannot pay much attention to the TV telephone communications. Thus, a problem arises in that the operability is degraded considerably.

In addition, there are also problems that, since each terminal has a key entry section, the operation becomes complicated and, when an informing sound is emitted, it is unknown which terminal it is emitted from.

These terminals each have a channel interface (I/F), a controller, and an man-machine interface, such as keys and a display, built in. That is, communications over multiple channels require as many signal processing circuits as the channels (terminals). In recent years, the processing capability of CPUs and the circuit integration have improved by leaps and bounds and signal and control processing for the multiple channels has become possible with a single controller (CPU). Nevertheless, since as many signal processing circuits as the communication channels have to be provided, there arises a problem in that cost and power dissipation increase.

Thus, the provision of multiple terminals and the provision of multiple man-machine interfaces particularly in radio communication terminals cause a problem of significant degradations in the quality of products, such as degraded operability, increased cost, and increased power dissipation.

DISCLOSURE OF INVENTION

It is therefore an object of the present invention to provide a radio communication terminal which, even if an operator uses multiple channels simultaneously, permits excellent operability, low cost and low power dissipation to be realized.

In order to achieve the object, according to the present invention there is provided a radio communication terminal connected with a base station over radio channels for making communications with the base station comprising: communication means for establishing multiple radio channels with the base station and making simultaneous communications over the multiple channels; and informing means for informing an operator at the terminal of information transmitted to and received from the base station over the multiple channels for each radio channel.

Also, according to the present invention there is provided a radio communication terminal connected with a base station over radio channels for making communications with the base station comprising: communication means including first transmission means for transmitting information over a first radio channel to the base station, second transmission means for transmitting information over a second radio channel to the base station, first reception means for receiving information over the first radio channel from the base station, and second reception means for receiving information over the second radio channel from the base station; display means for displaying data input from the input means and a picture received through the communication means; communication control means for establishing the first and second radio channels between the terminal and the base station and controlling the communication means to make simultaneous communications over the radio channels; and display control means for controlling the display means to display the information transmitted to and received from the base station over the radio channels for each radio channel.

That is, using the input means, the display means, the communication control means, and the display control means each of which is one in number, communications using first and second radio channels are realized. Thus, excellent operability, low cost and low power dissipation can be realized.

The communication control means has means for making at least voice data communication, video data communication, and message data communication, and the display control means simultaneously displays a picture in the video communication and data in the message communication on the display means.

The display control means displays information concerning either of the first and second radio channels on the display means, and the input means has a plurality of keys for entering data, the plurality of keys including a key for switching the information displayed on the display means to either of the first and second radio channels and, when the displayed information is switched, the functions of the keys being changed according to the types of radio channels after switching.

BEST MODE FOR CARRYING OUT THE INVENTION

Figure 1:
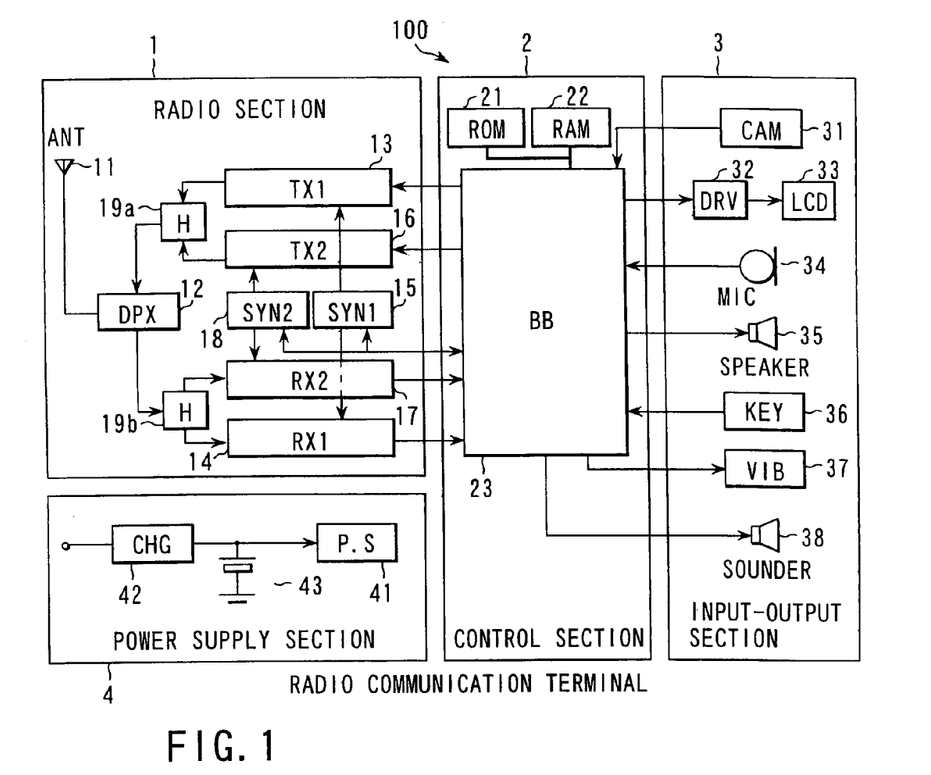
FIG. 1 is a block diagram of a radio communication terminal according to an embodiment of the present invention.

FIG. 1 shows the arrangement of a radio communication terminal 100 which allows two-channel simultaneous communications based on the FDMA technique as an embodiment of the present invention.

A radio section 1 is composed of an antenna (ANT) 11, a duplexer (DPX) 12, transmitters (TX1) 13 and (TX2) 16, synthesizers (SYN1) 15 and (SYN2) 18, receivers (RX1) 14 and (RX2) 17, a hybrid circuit 19a, and a distributor 19b. The hybrid circuit 19a and the distributor 19b, while being denoted by the same symbol, are differ from each other in function. That is, the hybrid circuit 19a has a function of preventing the output of the TX1 from being coupled with the output of the TX2 and vice versa. The distributor 19b has a function of distributing received signals from the DPX 12 to the RX1 and RX2 according to channels.

A control section 2 is composed of a ROM 21 stored with various programs for controlling the operation of this terminal, a work RAM 22, and a baseband signal processing unit BB23 for controlling the entire radio communication terminal 100.

An input-output section 3 is composed of a camera (CAM) 31, a display driver (DRV) 32, a display (LCD) 33, a microphone (MIC) 34, a speaker 35, a key entry section (KEY) 36, a vibrator (VIB) 37, and a sounder 38. The LCD 33 displays data inputted by the key 36, picture data received through the radio section 1, and video data inputted from the CAM 31. The speaker 35 outputs voice data inputted through the MIC 34 or voice data received through the radio section 1. The user is informed of an incoming call by the sounder 38 or the VIB 37.

In FIG. 1 there is illustrated an arrangement that radio communication terminals generally have; however, the CAM 31 and/or the VIB 37 may be omitted.

A power supply section 4 is composed of a power supply (PS) 41, a charging circuit (CHG) 42, and a battery (BAT) 43. The PS 41 supplies a stabilized voltage to each component of the radio communication terminal 100 as a supply voltage.

Next, the operation of the radio communication terminal 100 as a cellular phone terminal using one-radio channel communication will be described.

First, an operation when the radio communication terminal 100 receives an incoming call will be described. An incoming call signal is transmitted from a base station. The incoming call signal received by the antenna 1 is applied through the DPX 12, the distributor 19b and the RX 14 to the BB 23 where it is subjected to signal processing. After that, a response signal is transmitted through the TX1 13, the hybrid circuit 19a, the DPX 12, and the antenna 11 as instructed by the base station.

Upon receiving a specified response signal, the base station determines a message channel and returns a channel designation signal to the radio communication terminal 100.

The radio communication terminal 100 receives the channel designation signal transmitted from the base station over the same route as described above, then subjects it to signal processing in the BB 23 and sends a control signal to the SYN1 15 to switch a message channel to the designated message channel.

When switching of the message channel has been completed and communication over the message channel has been established, the operator is informed of an incoming call through visual or audible indication (for example, an incoming sound is output from the sounder 38).

When the operator makes a response by depressing a service button provided in the KEY 36, the signal route of the message channel is connected to the input-output equipment used in the corresponding communication mode to commence communication with the base station.

When the received signal is an audio signal, the input-output section 3 makes further connection to the MIC 34 and the SPEAKER 35. When the received signal is a TV phone signal, the CAM 31 and the LCD 33 are connected as input-output equipment.

Next, an operation when the radio communication terminal 100 transmits an outgoing call will be described.

The operator inputs into the BB 23 necessary information, such as a communication mode, the phone number of a terminal with which the connection is to be set up, through the user interface such as the KEY 36 and then depresses a transmit button provided in the KEY 36, thereby inputting a request for the outgoing call to the radio communication terminal.

The outgoing call signal is transmitted from the BB 23 through the TX1 13, the hybrid circuit 19a, the DPX 12, and the antenna 11. Upon receipt of the specified outgoing call signal, the base station determines a message channel and then returns a channel designating signal to the radio communication terminal 100.

Upon receipt of the channel designating signal transmitted from the base station over the same route as described above, the radio communication terminal 100 subjects the designating signal to signal processing in the BB 23 and then sends a channel control signal to the SYN1 15 to switch to the designated channel.

When channel switching has been completed and communication over the message channel has been established, a ringback signal is sent out from the network side and, when the designated terminal connected makes a response, service is established.

The signal route in the message channel is connected to the input-output equipment used in the communication mode at the same time the service is established. For example, in the case of voice service, a voice signal from the MIC 34 is applied to the TX1 13, and a voice signal received by the RX1 14 is amplified and applied to the speaker 35, whereby communication is made.

Next, the operation of the radio communication terminal 100 at the time of communication over multiple channels will be described. First, an incoming call operation in a state where communication has already been made using one channel will be described.

As described previously, when a new incoming call is made at the time when one-channel communication is being made using the TX11 13 and the RX1 14, an incoming call signal is sent from the base station.

The incoming call signal received by the antenna 11 is applied through the DPX 12, the distributor 19*b*, and the RX2 17 to the BB 23 where it is subjected to signal processing. After that, a response signal is transmitted through the BB 23, the TX2 16, the hybrid circuit 19*a*, the DPX 12, and the antenna 11.

Upon receipt of the specified response signal, the base station determines a message channel and returns a channel designating signal. Upon receipt of the channel designating signal transmitted from the base station, the radio communication terminal 100 subjects it to signal processing in the BB 23 and then sends a control signal to the SYN2 18 to switch to the designated channel.

When channel switching has been completed and communication on the message channel has been established, the radio communication terminal informs the operator of the presence of an incoming call by visually/audibly informing means (for example, a sound of incoming call is produced from the sounder 38).

When the operator makes a response by depressing the service button provided in the KEY 36, the message channel signal route is connected to the input-output equipment used in the corresponding communication mode, whereby communication is commenced.

Next, an outgoing call operation in a state where communication has already been made on one channel will be described.

When information required to designate a communication mode and a terminal with which the connection is to be set up is input from the KEY 36, input-output equipment is selected, and a transmit button is depressed, an outgoing call signal is transmitted from the TX2 16, the hybrid circuit 19*a*, the DPX 12, and the antenna 11.

Upon receipt of the specified outgoing call signal, the base station determines a message channel and returns a channel designating signal. Upon receipt of the channel designating signal transmitted from the base station over the RX2 route, the portable telephone terminal subjects it to signal processing in the BB 23 and then sends a control signal to the SYN2 18 to switch to the designated message channel.

When the channel switching has been completed and communication on the message channel has been established, a ringback signal is sent out from the network side and, when the designated terminal connected makes a response, service is established. The signal route in the message channel is connected to the input-output equipment used in the corresponding communication mode at the same time the service is established.

By such originating and incoming call operations as described above, the radio communication terminal 100 of the present invention can make simultaneous communication over two channels.

Figure 2:
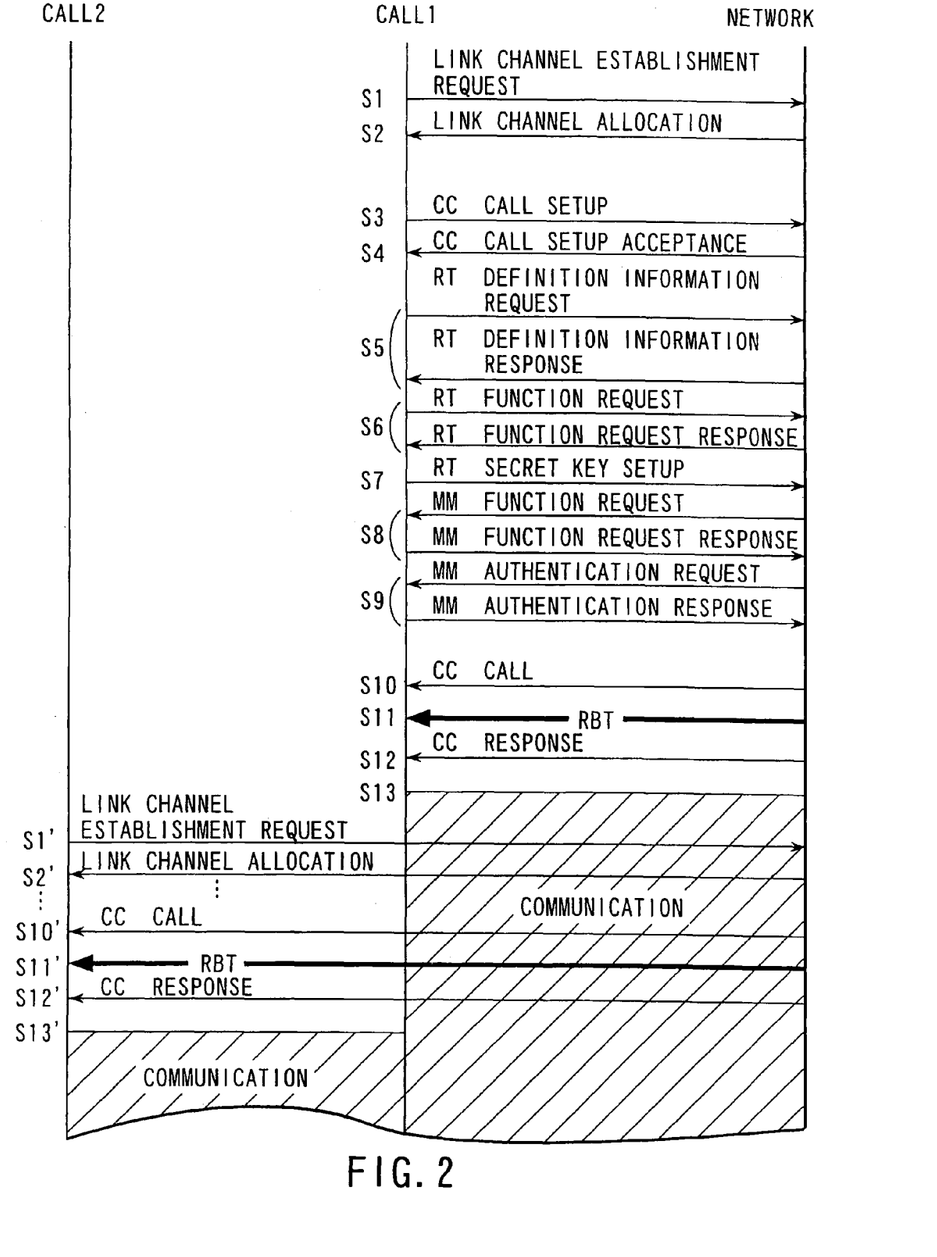
FIG. 2 shows an example of a calling operation according to the present invention.

Next, an operation when the present invention is applied to PHS (Personal Handyphone System) will be described. FIG. 2 shows an outgoing call operation using two PHS channels.

The user inputs into the BB 23 necessary information, such as a communication mode, the phone number of a terminal with which the connection is to be set up, through the user interface such as the KEY 36 and then depresses the transmit button provided in the KEY 36, thereby inputting a request for an outgoing call to the radio communication terminal.

The outgoing call signal is transmitted as a link channel establishment request signal from the BB 23 through the TX1 13, the hybrid circuit 19*a*, the DPX 12, and the antenna 11 (step S1). Upon receipt of the link channel establishment request signal, the network or the base station determines a message channel, or a link channel and then returns a link channel allocating signal to the radio communication terminal 100 (step S2).

Upon receipt of the link channel allocating signal transmitted from the network over the route of the ANT 11, the DPX 12, the distributor 19*b* and the RX1 14, the radio communication terminal 100 subjects the allocating signal to signal processing in the BB 23 and then sends a channel control signal to the SYN1 15 to switch to the designated channel.

When channel switching has been completed and communication over the message channel has been established, the terminal 100 transfers a call setup message (CC) to the network, so that the network starts call setup (step S3).

When the network receives the call setup message (CC) and confirms the justice of call acceptance, the network transmits to the terminal 100 a call setup acceptance message (CC) to indicate that the network is processing the call and makes the transition to the "outgoing call accepting" state (step S4).

When instructed to receive notice information, the terminal 100 makes a request for the notice information through a definition information request message (RT). The requested message sends the post information through a definition information response message (RT) (step S5).

When requested to make a request for RT function, the terminal 100 makes a request for RT function to the network. The terminal 100 is informed of the accepted RT function through the function request responding message (RT) (step S6).

The terminal 100 informs a secret key of the network with a secret key setup message (step S7).

The terminal 100 instructed to make a request to the network for MM function makes a request to the network for MM function through a function request message (MM). The accepted MM function informs the terminal 100 of a random number by transmitting a function request responding message (MM). The network is informed of the result of authentication operations using an authentication request message (MM). The network which has received the authentication responding message (MM) makes a decision of whether the result of authentication operations obtained using the authentication random number and the authentication key in the home memory of the terminal 100 matches that sent from the terminal 100. If the result of authentication is NG, then a call open procedure is initiated according to rules for call disconnection restoration. If the authentication result is OK, the call connection is continued (step S9).

Upon receipt of an indication that an incoming user call has been commenced, the network transmits a calling message (CC) to the terminal (step S10).

When a ringback signal (RBT) is sent from the network (step S11) and then a designated terminal makes a response (step S12), a service state becomes established (step S13).

At the same time the service state becomes established, the terminal 100 connects the link channel signal route to input-output equipment adapted for the communication mode to make communication.

When the user at the terminal 100 originates a call to another person during this communication, a request for link channel establishment is transmitted from the BB 23 through the TX2 16, the hybrid circuit 19*a*, the DPX 12, and the antenna 11 (step S1').

Upon receipt of the link channel establishment request signal, the network determines a link channel and then returns a link channel allocating signal to the radio communication terminal 100 (step S2').

The radio communication terminal receives the link channel allocating signal transmitted from the network over the route of the ANT 11, the DPX 12, the distributor 19b and the RX2 17, then subjects it to signal processing in the BB 23 and sends a channel control signal to the SYN1 15 to switch to the designated channel.

After that, negotiation is performed as in the above steps S3 to S12, putting the terminal 100 into the service state (step S13'). Thus, using TX1, TX2, RX1, and RX2, the terminal 100 is allowed to make simultaneous communication on two channels.

Figure 3:
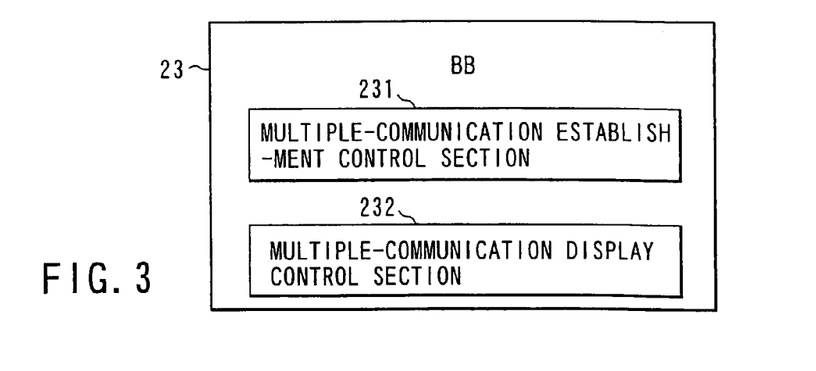
FIG. 3 shows the arrangement of the baseband signal processing unit in the radio communication terminal of FIG. 1.

In the radio communication terminal 100 of the present invention, as shown in FIG. 3, the BB 23 includes a multiple-communication establishment control section 231 and a multiple-communication display control section 232 in addition to normally equipped components. This multiple-communication establishment control section 231 allows the radio communication terminal 100 to make the above-described simultaneous communications. The multiple-communication display control section 232 performs control to display information concerning communication on each channel at the time of communications on two channels on the LCD 33.

The combinations of communications on two channels made by the radio communication terminal 100 include voice communication and message communication, TV phone and message communication, and information service reception from internet server and voice communication.

Figure 4A:
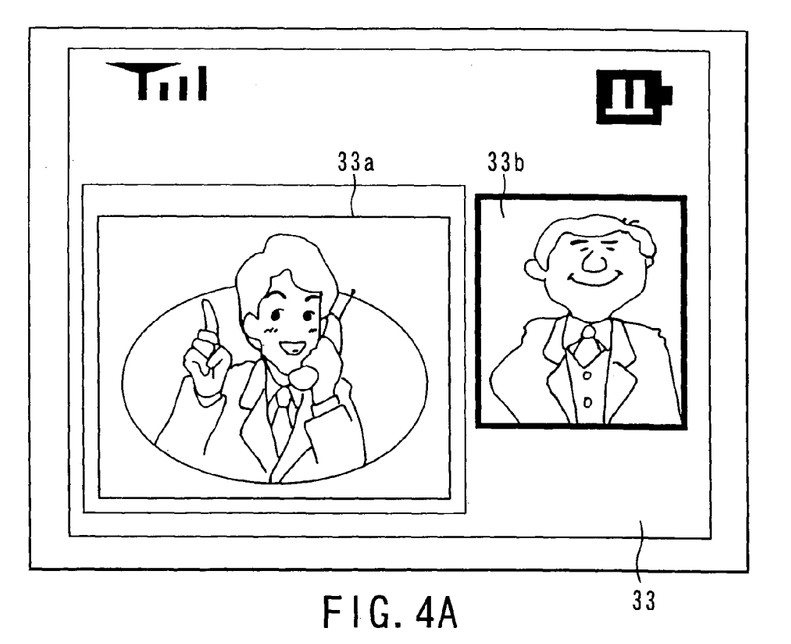
FIGS. 4A and 4B show an LCD display on the radio communication terminal of the present invention.

For example, in the combination of TV phone and message communication, the present invention provides picture and voice outputs of the TV phone and character information display in the message communication on one unit of input-output equipment. FIG. 4A shows a display screen of the LCD 33 when TV phone communication is made on one channel, while FIG. 4B shows a display screen of the LCD 33 when communications are made on two channels.

That is, as shown in FIG. 4A, in a state where TV phone communication is made on one channel, the LCD 33 displays received picture information 33a and picture information 33b captured by the CAM 31 and the speaker 35 outputs received voice information as voice.

Figure 4B:
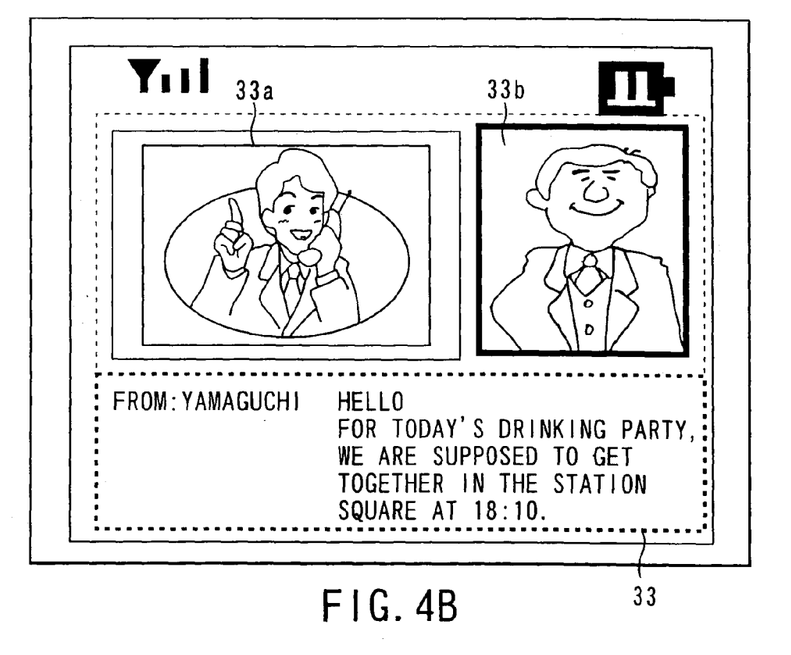

When message communication is made with this state continued, the multiple-communication establishment control section 231 controls the TV phone communication and message communication and the multiple-communication display control section 232 displays the received picture information 33a and the picture information captured by the CAM 31 and displays received message information 33c in the lower portion of the LCD 33 as shown in FIG. 4B.

With another embodiment, it is also possible to read information concerning two or more persons with which the connection is to be set up (phone numbers and names) from a telephone directory memory in the radio communication terminal 100, make simultaneous communications with those persons, and display information concerning each communication on the LCD 33.

As described above, the radio communication terminal 100 can inform the user of information concerning multiple communications with a single display unit and hence has excellent operability.

In addition, the radio communication terminal 100 of the present invention can display communication information visually and audibly with one user interface even in communications using multiple channels, eliminating the necessity of providing a plurality of items of input-output equipment. Moreover, communication control and display control of multiple channels can be performed by one control section BB 23, realizing excellent operability, low cost and low power dissipation.

Figure 5:
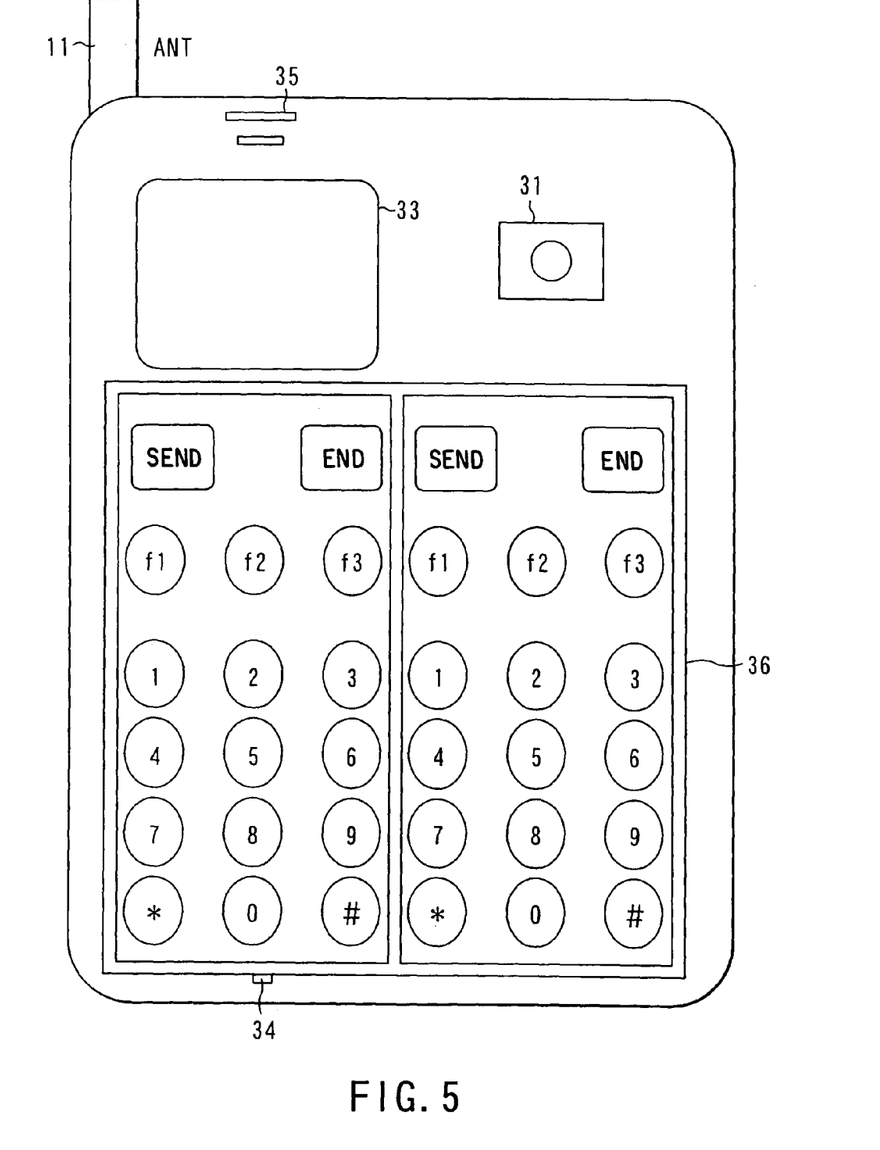
FIG. 5 is an exterior view of an embodiment of the radio communication terminal according to the present invention.
Figure 6:
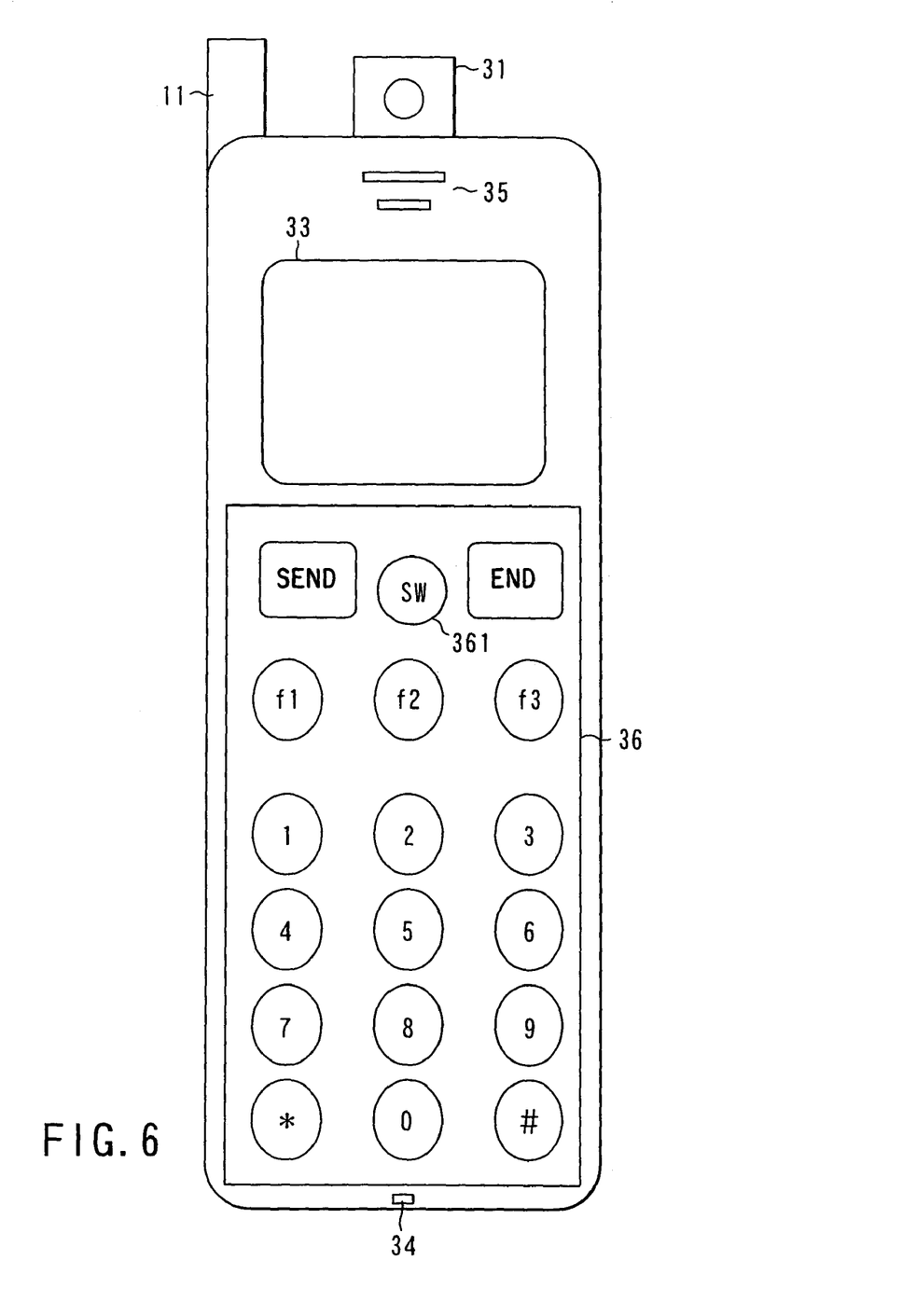
FIG. 6 is an exterior view of another embodiment of the radio communication terminal according to the present invention.

To accommodate multiple channels, key entry sections 36a and 36b corresponding to the channels may be provided as shown in FIG. 5. In the present invention, however, only one key entry section 36 is provided which is equipped with a switch SW 361 for switching between communication channels at the time of multiple-channel communications as shown in FIG. 6. For example, when TV phone communication and message communication are made simultaneously, depressing the switch SW 361 allows switching to be made between communications and the key function allocation (i.e., mode) to be changed according the service contents of each communication. The switching may be made at the time at which communications of multiple channels are occurred.

Figure 7:
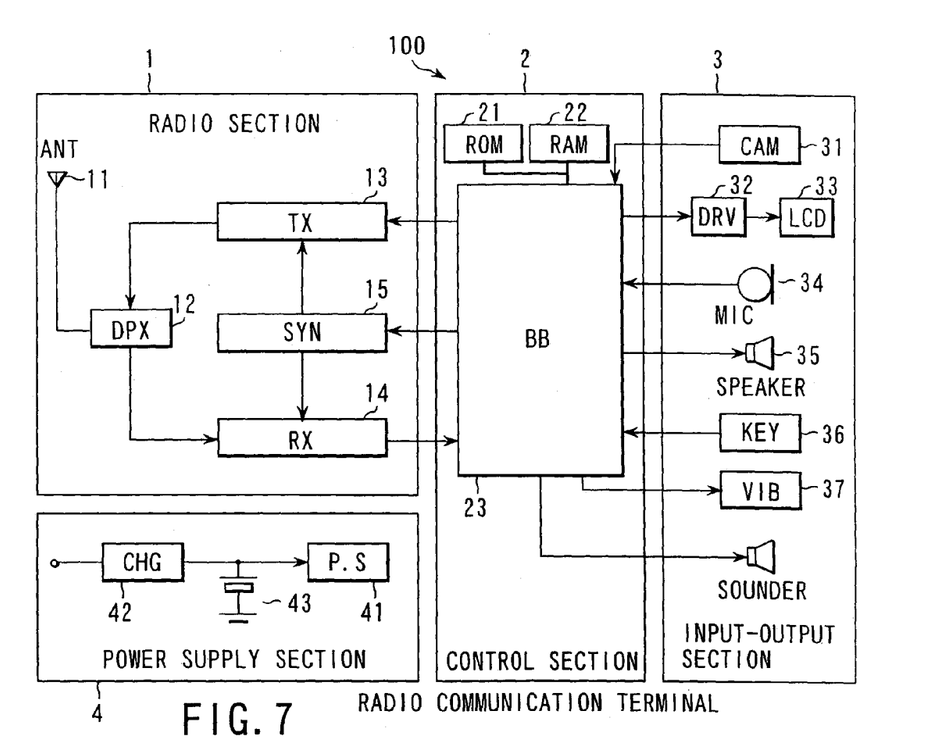
FIG. 7 is a block diagram of a radio communication terminal according to another embodiment of the present invention.

Although the radio communication terminal of the present invention shown in FIG. 1 has been described as being arranged to accommodate two-channel communications based on FDMA, the present invention is also applicable to a radio communication terminal 100 which uses a time-division multiplexing system (TDMA) as the radio communication system and has one transmission/reception system as shown in FIG. 7.

In the radio communication terminal 100 shown in FIG. 7, the radio section 1 is composed of ANT 11, DPX 12, TX 13, RX 14, and SYN 15. That is, the radio communication terminal of FIG. 7 has a single transmission/reception system and differs in arrangement from the radio communication terminal shown in FIG. 1 which has two transmission/reception systems. Further, the BB 23 in the radio communication terminal shown in FIG. 7 also has a multiple-communication establishment control section and a multiple-communication display control section shown in FIG. 3.

Furthermore, the present invention is not restricted to the aforementioned radio communication systems but can also be applied to a radio communication terminal using a code division multiplexing (CDMA) system. In the case of CDMA, the provision of a single transmission/reception system allows two-channel communications, ensuring that power dissipation and cost are reduced in comparison with the case where two radio communication terminals are used.

As described above, the present invention has a circuit arrangement in one casing that allows communications over multiple channels and can display user information of the multiple channels and communication statuses on a display unit such as LCD through the use of one user interface. Thus, since user information and statuses can be recognized easily, excellent operation is realized. Because there is no need of providing a control circuit, a power supply and a user interface for each channel, power dissipation and cost can be reduced.

The invention claimed is:

1. A radio communication terminal, comprising:
   a first radio communication circuitry for establishing a first radio channel with a base station and making communications over the first radio channel;
   a second radio communication circuitry for establishing a second radio channel with the base station and making communications over the second radio channel;
   a hybrid circuitry for controlling the first radio communication circuitry and the second radio communication circuitry such that the first radio channel and the second radio channel carry communication simultaneously; and
   a display section for informing an operator at the terminal of information concerning communication on each of the first and second radio channels simultaneously;
   wherein the display section includes a first display section which displays a picture concerning a first communication entity received by the first radio communication circuitry and a picture concerning an operator at the terminal transmitted by the first radio communication circuitry, and a second display section which displays a message from a second communication entity received by the second radio communication circuitry while the communications are made by the first radio communication circuitry.

2. A radio communication terminal, comprising:
a first radio communication circuitry for establishing a first radio channel with a base station and making communications over the first radio channel;
a second radio communication circuitry for establishing a second radio channel with the base station and making communications over the second radio channel;
a control circuitry for controlling the first radio communication circuitry and the second radio communication circuitry such that the first radio channel and the second radio channel carry communication simultaneously; and
a display section for informing an operator at the terminal of information concerning communication on each of the first and second radio channels simultaneously;
wherein the display section includes a first display section which displays a picture concerning a first communication entity received by the first radio communication circuitry and a picture concerning an operator at the terminal transmitted by the first radio communication circuitry, and a second display section which displays a message from a second communication entity received by the second radio communication circuitry while the communications are made by the first radio communication circuitry.

3. A radio communication terminal, comprising:
a first radio communication circuitry for establishing a radio channel with a base station and making communications over the radio channel;
a second radio communication circuitry for establishing a radio channel with the base station and making communications over the radio channel;
a control circuitry for controlling the first radio communication circuitry and the second radio communication circuitry such that the radio channel carry communication simultaneously; and
a display section for informing an operator at the terminal of information concerning communication on each of the radio channel simultaneously;
wherein the display section includes a first display section which displays a picture concerning a first communication entity received by the first radio communication circuitry and a picture concerning an operator at the terminal transmitted by the first radio communication circuitry, and a second display section which displays a message from a second communication entity received by the second radio communication circuitry while the communications are made by the first radio communication circuitry.

4. A radio communication terminal, comprising:
a first radio communication circuitry for establishing a first radio channel with a base station and making communications over the first radio channel;
a second radio communication circuitry for establishing a second radio channel with the base station and making communications over the second radio channel;
a control circuitry for controlling the first radio communication circuitry and the second radio communication circuitry such that the first radio channel and the second radio channel carry communication simultaneously; and
a display section for informing an operator at the terminal of information concerning communication on each of the first and second radio channels simultaneously;
wherein the display section includes a first display section which displays a picture concerning a first communication entity received by the first radio communication circuitry, and a second display section which displays a message from a second communication entity received by the second radio communication circuitry while the communications are made by the first radio communication circuitry.

5. A radio communication terminal, comprising:
a radio section configured to communicate with a base station over a radio channel for TV phone communication and message communication;
a multiple-communication control section configured to establish the TV phone communication and the message communication with the base station via the radio section simultaneously;
a display configured to display a first information concerning the TV phone communication and a second information concerning the message communication; and
a display control section configured to display the first information and the second information on the display section when the multiple-communication control section establishes the TV phone communication and the message communication.

6. The radio communication terminal according to claim 5, wherein the first information comprises a first picture concerning a communication entity received from the radio section and a second picture concerning an operator at a terminal transmitted from a radio section.

7. The radio communication terminal according to claim 5, wherein the display control section is configured to display the first information on a first area of the display and the second information on a second area of the display.

8. The radio communication terminal according to claim 5, wherein the TV phone communication communicates with a first communication entity and the message communication communicates with a second communication entity different from the first communication entity.

9. The radio communication terminal according to claim 5, wherein the radio section comprises an antenna, a duplexer, a transmitter, a synthesizer, and a receiver.

* * * * *

UNITED STATES PATENT AND TRADEMARK OFFICE
CERTIFICATE OF CORRECTION

| | |
|---|---|
| PATENT NO. | : 7,933,630 B2 |
| APPLICATION NO. | : 11/797285 |
| DATED | : April 26, 2011 |
| INVENTOR(S) | : Yamaguchi |

It is certified that error appears in the above-identified patent and that said Letters Patent is hereby corrected as shown below:

On the Face Page, in Field (74), under "Attorney, Agent or Firm", in Column 2, Line 1, delete "Maschoff Gilmore & Isrealsen" and insert -- Maschoff Gilmore & Israelsen --, therefor.

Signed and Sealed this
Twenty-fourth Day of July, 2012

David J. Kappos
*Director of the United States Patent and Trademark Office*